United States Patent [19]
Laugier

[11] Patent Number: 5,520,014
[45] Date of Patent: May 28, 1996

[54] FREEZER BOX

[76] Inventor: Michael T. Laugier, Clare Glens, Newport, County Tipperary, Ireland

[21] Appl. No.: 403,790

[22] PCT Filed: Sep. 20, 1993

[86] PCT No.: PCT/IE93/00048

§ 371 Date: Mar. 15, 1995

§ 102(e) Date: Mar. 15, 1995

[87] PCT Pub. No.: WO94/07096

PCT Pub. Date: Mar. 31, 1994

[30] Foreign Application Priority Data

Sep. 18, 1992 [IE] Ireland .................. S92-2671

[51] Int. Cl.[6] .................................. F25D 3/08
[52] U.S. Cl. .......................... 62/457.2; 99/455
[58] Field of Search .................. 62/1, 440, 457.1, 62/457.2, 457.6; 99/455

[56] References Cited

U.S. PATENT DOCUMENTS

| | | | |
|---|---|---|---|
| 1,955,817 | 4/1934 | Marchiony | 62/1 |
| 3,802,220 | 4/1974 | Pompo | 62/530 |
| 4,528,439 | 7/1985 | Marney, Jr. et al. | 219/386 |
| 4,550,575 | 11/1985 | DeGaynor | 62/308 |
| 5,050,387 | 9/1991 | Bruce | 62/60 |
| 5,082,115 | 1/1992 | Hutcheson | 206/545 |
| 5,105,627 | 4/1992 | Kurita | 62/62 |
| 5,201,194 | 4/1993 | Flynn et al. | 62/457.3 |

FOREIGN PATENT DOCUMENTS

| | | |
|---|---|---|
| 2497933 | 7/1982 | France. |
| 3506779 | 8/1986 | Germany. |
| 808690 | 2/1959 | United Kingdom. |
| 1004791 | 9/1965 | United Kingdom. |
| 1032859 | 6/1966 | United Kingdom. |
| 1148813 | 4/1969 | United Kingdom. |

*Primary Examiner*—Henry A. Bennet
*Assistant Examiner*—William C. Doerrler
*Attorney, Agent, or Firm*—Kinney & Lange

[57] ABSTRACT

A freezer box (1) comprises a first heat exchange wall (2) which defines a main hollow interior region (7) for ice cream or other liquid material to be cooled, chilled or frozen. A jacket (10) extends around the first heat exchange wall (2) to form a first secondary hollow interior region (12) for brine (13) which is frozen for freezing the ice cream. A lid (30) which comprises a secon heat exchange wall (32) having a cylindrical portion (46) extending into the main hollow interior region (7) closes the freezer box (1). Brine (39) is also provided in a second secondary hollow interior region (38) in the lid (30) for freezing the ice cream. The dimensions of the first and second heat exchange walls (2) and (32) are such that the maximum distance between any location in the main hollow interior region (7) its nearest heat exchange wall (2) or (32) does not exceed 13 mm to promote rapid freezing of the ice cream.

50 Claims, 4 Drawing Sheets

FREEZER BOX

BACKGROUND OF THE INVENTION

The present invention relates to a freezer box and in particular, though not limited to a freezer box for freezing ice cream and the like.

Ice cream is prepared by mixing the appropriate ingredients at room temperature, and then freezing the mixture. The freezing may be carried out in a continuous process or in a batch process. In a continuous process, the mixed ingredients are continuously passed through a freezer where the temperature of the mixture is reduced so that it commences to solidify. In a batch process, a batch of mixed ingredients is placed in a freezer until the mixture commences to solidify. In both cases, the partly solidified mixture is then transferred for packaging and further freezing. While both of these processes are adequate for manufacturing ice cream in large quantities, typically, on a commercial scale, in general, they are unsuitable for producing relatively small batches of ice cream, typically, a batch of the size which would be made at home for home use or for use in a relatively small restaurant. Various attempts have been made to provide apparatus, such as, for example, freezer boxes for the manufacture of ice cream in relatively small batches in the home, however, in general, such apparatus and freezer boxes suffer from a number of disadvantages. In general, the ice cream produced from such apparatus and freezer boxes is of relatively poor quality. In particular, the ice cream lacks the relatively smooth consistency which is desirable in a good quality ice cream. During the freezing process of an ice cream mixture, ice crystals are formed from the liquid water in the ice cream mixture. To maintain a relatively smooth consistency in the frozen ice cream, it is essential that the ice crystals formed should be relatively small. The smaller the ice crystals can be maintained the smoother will be the ice cream. One of the problems with known apparatus and freezer boxes for use in the production of home made ice cream is that the ice crystals formed in the ice cream, in general, are relatively large, and thus, significantly and adversely affect the consistency of the frozen ice cream.

GB-A-808,690 describes a device for cooling solid and liquid substances and keeping them cool. This is effected by providing two hollow bodies which contain a liquid freezable cooling medium and which have heat exchange surfaces on the inside. While such a device is useful for cooling substances and keeping them cool, it is not appropriate for freezing ice cream and the like where there is a need to limit the size of the ice crystals formed during the freezing process to provide a good frozen product.

There is therefore a need for a freezer box for preparing relatively small batches of ice cream which enables ice cream of a relatively smooth consistency to be produced.

The present invention is directed towards providing such a freezer box.

SUMMARY OF THE INVENTION

According to the invention there is provided a freezer box, for freezing, chilling or cooling a liquid or solid, the freezer box comprising a first heat exchange wall having a first heat exchange surface, the first heat exchange wall defining a main hollow interior region for said liquid or solid, said region having an open mouth, a jacket extending at least partly around and spaced from the first heat exchange wall to form therebetween a first secondary hollow interior region for a heat sink material, a second heat exchange wall releasably engagable with the freezer box and having a second heat exchange surface, the second heat exchange wall defining a second secondary hollow interior region for holding a heat sink material, characterised in that the second heat exchange surface extends into the main hollow interior region such that the maximum distance between any location in the main hollow interior region and its nearest heat exchange surface does not exceed 26 mm.

The advantages of the invention are many, the most important advantage of the freezer box according to the invention is that it enables the production of relatively small batches of ice cream, sorbets and the like, typically, a batch of home made ice cream or sorbet to be produced with a relatively smooth consistency. By virtue of the fact that the main hollow interior region is defined by the first heat exchange wall, and the second heat exchange wall extends into the main hollow interior region, the maximum distance between any location in the main hollow interior region and its nearest heat exchange wall will be relatively small. This promotes relatively rapid freezing of the ice cream, which it has been found ensures that ice crystals formed during the freezing process are of relatively small size and of sufficiently small size to provide a frozen ice cream with a relatively smooth consistency, and in particular, a consistency which is significantly smoother than can be achieved from known freezer boxes for freezing relatively small batches of ice cream. The limit of 26 mm ensures that there is no location in the main hollow interior region which is a distance from its nearest heat exchange surface which would prevent relatively rapid freezing of the ice cream mix.

Preferably, the maximum distance between any location in the main hollow interior region and its nearest heat exchange surface does not exceed 20 mm, thus, further ensuring relatively rapid freezing of the ice cream mix. Advantageously, the maximum distance between any location in the main hollow interior region and its nearest heat exchange surface does not exceed 13 mm, thus, further ensuring relatively rapid freezing of the ice cream mix.

In one embodiment of the invention the first and second heat exchange surfaces are located relative to each other so that the maximum distance between the first and second heat exchange surfaces measured perpendicularly to the respective surfaces does not exceed 40 mm. This promotes relatively rapid freezing of the ice cream. Preferably, the maximum distance between the first and second heat exchange surfaces measured perpendicularly to the respective surfaces does not exceed 30 mm, thus, ensuring relatively rapid freezing of the ice cream mix. Advantageously, the maximum distance between the first and second heat exchange surfaces measured perpendicularly to the respective surfaces does not exceed 26 mm, thus, further ensuring relatively rapid freezing of the ice cream mix.

Advantageously, the jacket extends completely around the first heat exchange wall. The advantage of this is that it ensures a relatively even rate of heat transfer through the first heat exchange wall.

In one embodiment of the invention the first heat exchange wall comprises a first inner base and a first upstanding inner side wall extending around and upwardly from the first inner base. Preferably, the first inner side wall is of cylindrical shape. Advantageously, the open mouth is defined by the first inner side wall. These features provide a relatively convenient construction of freezer box.

Advantageously, the area of the open mouth is substantially similar to the transverse cross-sectional area of the main hollow interior region formed by the first inner side wall, to facilitate easy removal of the frozen ice cream from the main hollow interior region.

In one embodiment of the invention the area of the open mouth is similar to or greater than the maximum transverse cross-sectional area of the main hollow interior region looking through the open mouth. This further facilitates easy removal of the frozen ice cream from the main hollow interior region.

In another embodiment of the invention the jacket comprises a first outer base spaced apart from the first inner base, and a first upstanding outer side wall extending around and upwardly from the first outer base, the first outer base and the first outer side wall being spaced apart from the first inner base and the first inner side wall, respectively, and forming with first inner base and the first inner side wall the first secondary hollow interior region. Preferably, the first outer side wall is of cylindrical shape and is co-axial with the first inner side wall. Advantageously, the first inner side wall and the first outer side wall are joined adjacent the open mouth. These features provide a relatively convenient construction of freezer box.

In one embodiment of the invention the second heat exchange wall forms a lid for closing the open mouth, the second heat exchange surface co-operating with the first heat exchange surface for forming the main hollow interior region. This feature enhances the efficiency of the freezer box.

Preferably, a portion of the second heat exchange wall extends into the main hollow interior region to further improve the efficiency of the freezer box. Advantageously, the portion of the second heat exchange wall extending into the main hollow interior region is formed by a second side wall which terminates in a second base. Preferably, the second side wall is of cylindrical shape. These features further improve the efficiency of the freezer box.

In one embodiment of the invention a second outer wall spaced apart from the second heat exchange wall forms with the outer surface of the second heat exchange wall the second secondary hollow interior region. Preferably, the second outer wall and the second heat exchange wall are joined around respective peripheral edges thereof. These features provide a relatively convenient construction of freezer box.

In one embodiment of the invention the first and second heat exchange walls are of heat conductive material to promote heat transfer between the heat sink material and the ice cream. Preferably, the heat conductive material is stainless steel. Advantageously, the stainless steel is stainless steel type 18–10.

In a further embodiment of the invention a first pressure release means is provided communicating with the first secondary hollow interior region for releasing a build up of pressure in the first secondary hollow interior region. This provides a relative safe construction of freezer box.

In one embodiment of the invention the first pressure release means is provided at a location adjacent the position where the first inner side wall and the first outer side wall are joined. Advantageously, the first pressure release means is provided intermediate the first inner side wall and the first outer side wall adjacent the joint between the said side walls. Preferably, the first pressure release means comprises a first sealing means located between and sealing the joint between the first inner and outer side walls, the first sealing means being responsive to a build up of pressure in the first secondary hollow interior region for releasing the pressure therein. Advantageously, the first sealing means is of a material which melts on being subjected to heat for breaking the seal in the joint between the first inner and outer side walls. Advantageously, the first sealing means is of a material which melts on being subjected to the boiling point at a relatively safe pressure of the heat sink material. These features of the invention further enhance the safety of the freezer box.

In one embodiment of the invention the first sealing means is of plastics material, and preferably, the first sealing means is of polyethylene material.

In another embodiment of the invention a second pressure release means is provided communicating with the second secondary hollow interior region for releasing a build up of pressure in the second secondary hollow interior region. This further enhances the safety of the freezer box.

Preferably, the second pressure release means is provided at a location adjacent the position where the second heat exchange wall and the second outer wall are joined. Advantageously, the second pressure release means is provided intermediate the second heat exchange wall and the second outer wall adjacent the joint between the said walls. Preferably, the second pressure release means comprises a second sealing means located between and sealing the joint between the second heat exchange wall and the second outer wall, the second sealing means being responsive to a build up of pressure in the second secondary hollow interior region for releasing the pressure therein. Advantageously, the second sealing means is of a material which melts on being subjected to heat for breaking the seal in the joint between the said walls. Preferably, the second sealing means is of a material which melts on being subjected to the boiling point at a relatively safe pressure of the heat sink material. These features further enhance the safety of the freezer box.

In one embodiment of the invention the second sealing means is of plastics material. Preferably, the second sealing means is of polyethylene material.

In a further embodiment of the invention the heat sink material is provided in the first and second secondary hollow interior regions. Preferably, the heat sink material is brine. Preferably, the heat sink material has a freezing point not higher than 0° C. Advantageously, the heat sink material has a freezing point not higher than −10° C. This promotes relatively rapid freezing of the ice cream mix.

Advantageously, the heat sink material has a freezing point not higher than −15° C. This further promotes relatively rapid freezing of the ice cream mix.

Alternatively, first and second connecting means are provided for respectively connecting the first and second secondary hollow interior regions to the heat sink material for circulation of the heat sink material through the respective first and second secondary hollow interior regions.

In one embodiment of the invention the capacity of the main hollow interior region with the second heat exchange wall engaged with the freezer box is at least 1 liter. In one embodiment of the invention the capacity of the main hollow interior region with the second heat exchange wall engaged with the freezer box does not exceed 1.5 liters. Preferably, the capacity of the main hollow interior region with the second heat exchange wall engaged with the freezer box is approximately 1.1 liters. In one embodiment of the invention the capacity of the main hollow interior region with the second heat exchange wall engaged with the freezer box is in the range of 0.5 liters to 2.5 liters. By maintaining the capacity of the main hollow interior region within the range 0.5 to 2.5 liters, a relatively efficient freezer box is provided which promotes relatively rapid freezing of the ice cream mix in the main hollow interior region, and in particular, a freezer box which is suitable for home use is provided. By providing the main hollow interior region of the freezer box with a capacity in the range of 1 liter to 1.5 liters a relatively economic freezer box is provided, a freezer box which is economical to use, and which is convenient to handle.

Indeed, the many advantages of the invention discussed above are also achievable when the freezer box is used for chilling, cooling or freezing any other liquid or semi-liquid material placed in the main hollow interior region.

BRIEF DESCRIPTION OF THE DRAWINGS

The invention will be more clearly understood from the following description of some preferred embodiments thereof, given by way of example only, with reference to the accompanying drawings, in which.

DETAILED DESCRIPTION OF THE PREFERRED EMBODIMENTS

Referring to the drawings, and initially to FIGS. 1 to 4 there is illustrated a freezer box according to the invention indicated generally by the reference numeral 1 for freezing, chilling or cooling a liquid, in this particular embodiment of the invention for freezing ice cream. The freezer box 1 comprises a first heat exchange wall 2 of heat conductive material, namely, sheet stainless steel 18–10 having an outer surface 3 and an opposite first heat exchange surface 4. The first heat exchange surface 4 defines a main hollow interior region 7 for the ice cream. The first heat exchange wall 2 is shaped to form a first inner base 8 and a first inner cylindrical side wall 9 extending around and upwardly from the first inner base 8. A jacket 10 also of sheet stainless steel 18–10 material extends completely around the first heat exchange wall 2 and forms with the first heat exchange wall 2 a first secondary hollow interior region 12 for a heat sink material, in this embodiment of the invention brine 13 for freezing the ice cream in the main hollow interior region 7. The freezing point of brine, in other words, the temperature at which crystallisation commences is approximately −15° C. Heat is exchanged between the frozen or chilled brine and the ice cream between the first heat exchange wall 2 for freezing the ice cream. The jacket 10 is shaped to form a first outer base 14 and a first outer side wall 15 extending around and upwardly from the first outer base 14. The first outer base 14 and first outer side wall 15 are spaced apart from the outer surface 3 of the first inner base 8 and first inner side wall 9 to form the first secondary hollow interior region 12 therebetween. Outwardly extending flanges 18 and 19 extend respectively from and completely around the first inner side wall g and the first outer side wall 15 and are joined together along a continuous peripheral joint 20 extending completely around the freezer box 1. The flange 18 extending from the first inner side wall 9 is bent at 21 and 22 to form a radially inwardly extending return 23 for engaging the flange 19 for securing the joint 20. A first sealing means, namely, an annular first sealing gasket 25 is located and compressed between the flanges 18 and 19 for sealing the joint 20. The first sealing gasket 25 also acts as a pressure release means for releasing a build up of pressure in the first secondary hollow interior region 12 should the brine 13 in the first secondary hollow interior region 12 be inadvertently allowed to boil. The first sealing gasket 25 is of a plastics material, in this case, polyethylene material which melts at a temperature of between 105° C. and 137° C., thus, in the event of the brine 13 in the first secondary hollow interior region 12 reaching boiling point at a pressure of approximately 1.5 atmospheres which corresponds to a boiling point temperature of approximately 115° C. the first sealing gasket 25 melts thereby permitting a release of pressure between the flanges 18 and 19 through the joint 20. At 2.0 atmospheres the boiling point temperature of brine is approximately 125° C., which is still a relatively safe pressure.

The first inner side wall 9 forms an open mouth 28 to the main hollow interior region 7. The area of the open mouth 28 is similar to the transverse cross-sectional area of the main hollow interior region 7 to facilitate easy removal of the frozen ice cream from the main hollow interior region 7.

A lid 30 releasably engages the freezer box 1 for closing the open mouth 28. The lid 30 comprises a second heat exchange wall 32 of a heat conductive material, namely, sheet stainless steel 18–10 material having an outer surface 34 and an opposite second heat exchange surface 35 which when the lid 30 is engaged in the open mouth 28 forms with the first heat exchange surface 4 the main hollow interior region 7. A second outer wall 36 also of sheet stainless steel 18–10 material spaced apart from the outer surface 34 of the second heat exchange wall 32 is secured around a continuous peripheral joint 37 to the second heat exchange wall 32 and forms with the secondary heat exchange wall 32 a second secondary hollow interior region 38 for a heat sink material, namely, brine 39 similar to the brine 13 described in the first secondary hollow interior region 12. Heat is exchanged through the second heat exchange wall 32 between the ice cream and the brine 39 in the second secondary hollow interior region 38. Flanges 40 an 41 extend radially outwardly from and completely circumferentially around the second heat exchange wall 32 and the second outer wall 36, respectively, to form the joint 37. The flange 41 is bent at 43 and 44 similarly as the flange 18 is bent and engages the flange 40 for securing the joint 37. A second sealing means, namely, a second annular sealing gasket 45 which is substantially similar to and of similar material to the first sealing gasket 25 seals the joint 37. The second sealing gasket 45 in similar fashion to the first sealing gasket 25 acts as a second pressure release means for releasing pressure in the second secondary hollow interior region 38 in the event of inadvertent boiling of the brine 39. The second heat exchange wall 32 is shaped to form a cylindrical portion 46 which extends into the main hollow interior region 7. The cylindrical portion 46 is formed by a second cylindrical side wall 47 which terminates in a second base 48, both of which are respectively spaced apart from the first inner side wall 9 and the first inner base 10. The second heat exchange wall 32 is shaped at 49 to engage the first inner side wall 9 adjacent the open mouth 28 for locating the lid 30 with the second cylindrical side wall 47 coaxially with the first inner side wall 9.

Figure 1:
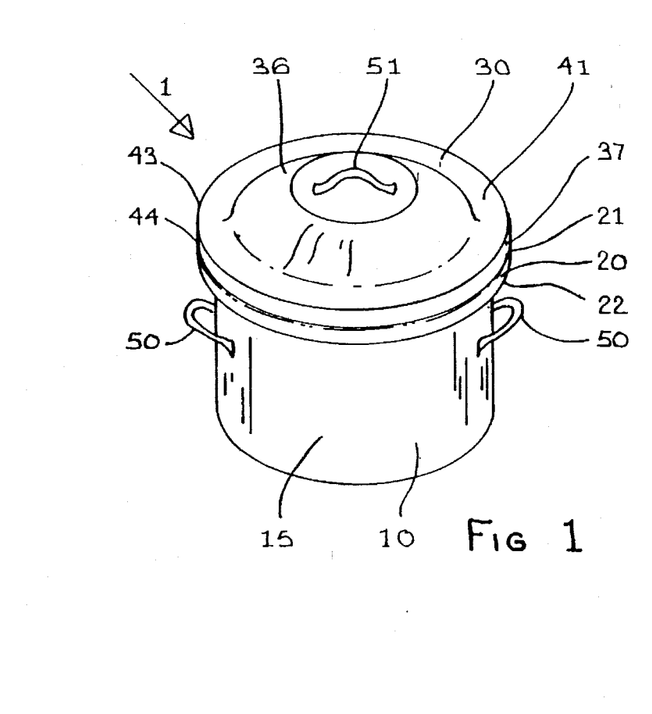
FIG. 1 is a perspective view of a freezer box according to the invention.
Figure 2:
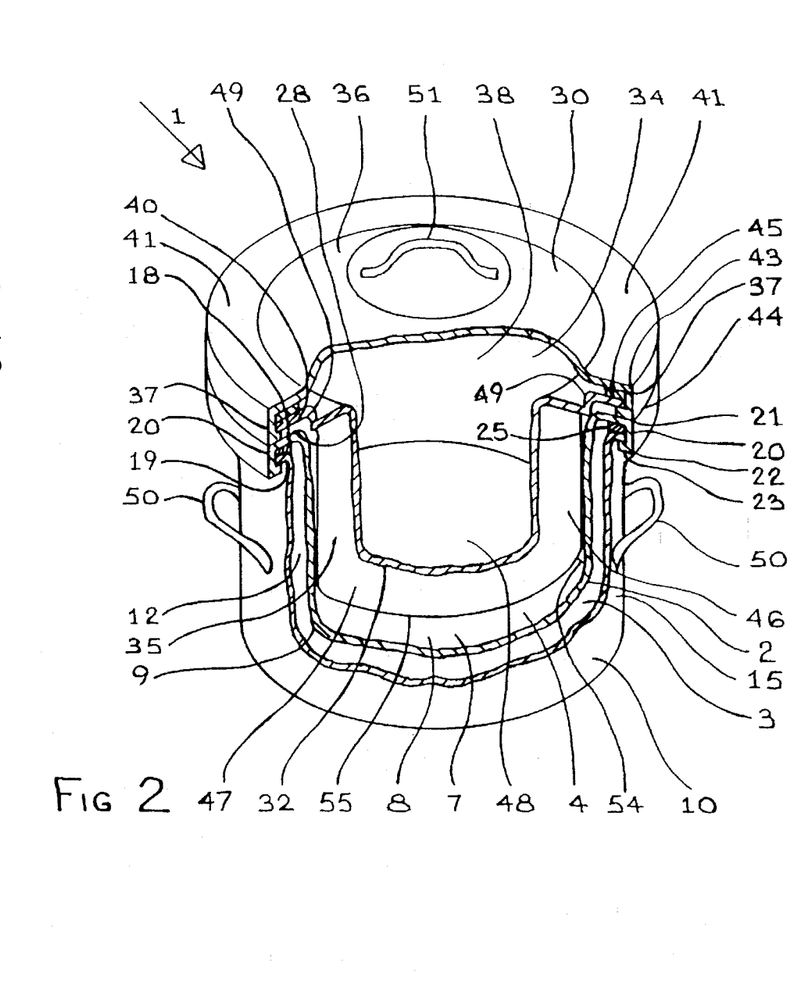
FIG. 2 is an enlarged cut-away perspective view of the freezer box of FIG. 1.
Figure 3:
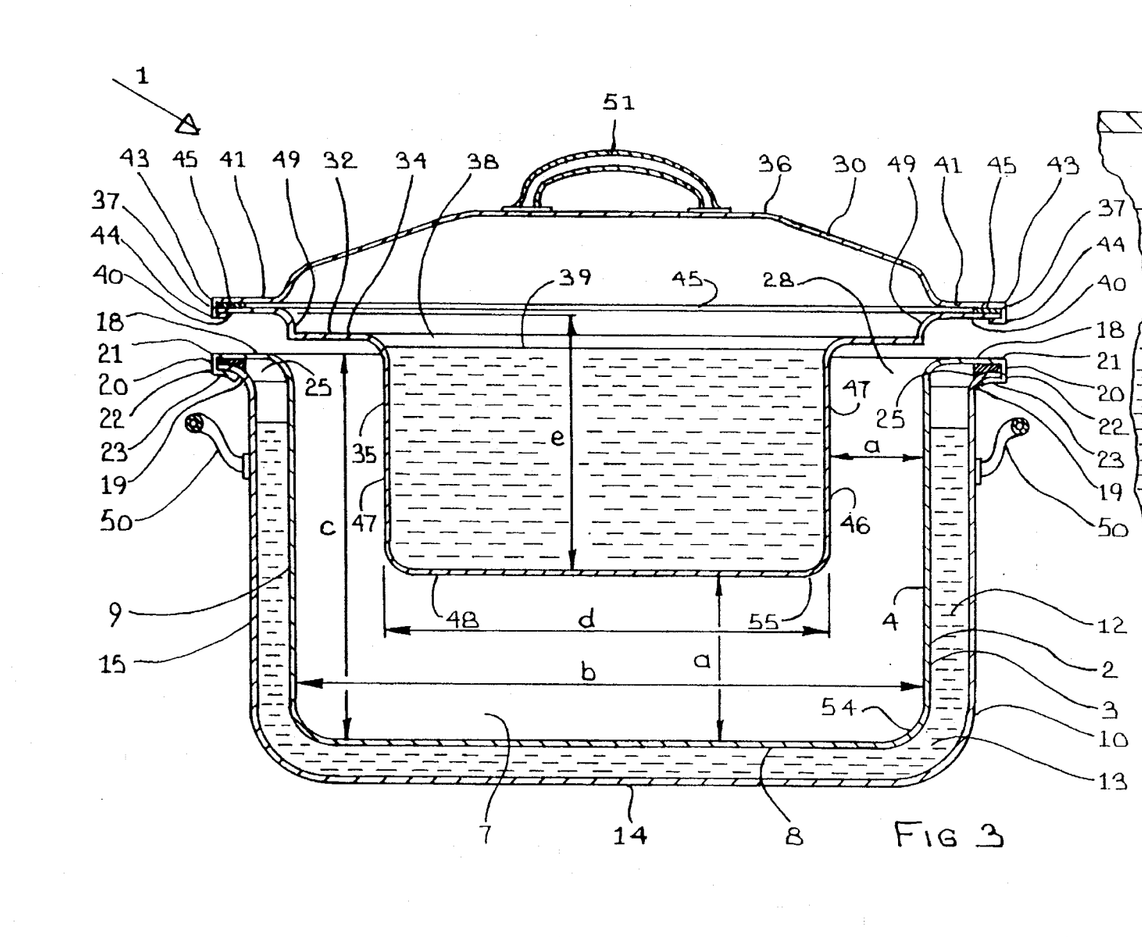
FIG. 3 is a cross-sectional elevational view of the freezer box of FIG. 1.
Figure 4:
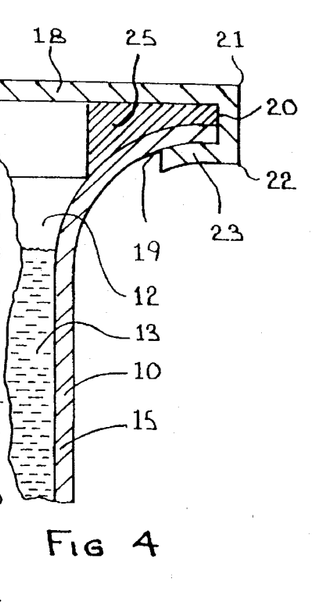
FIG. 4 is a sectional view of a detail of the freezer box of FIG. 1.
Figure 5:
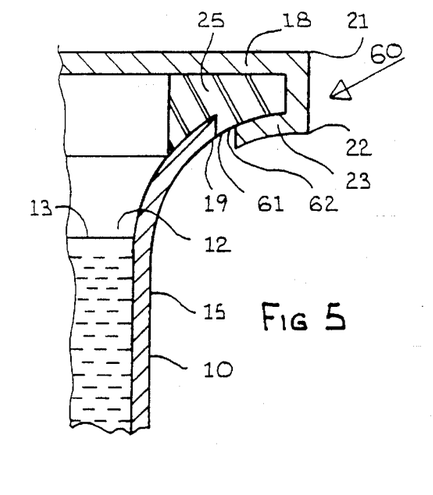
FIG. 5 is a cross-sectional view of portion of a freezer box according to another embodiment of the invention.
Figure 6:
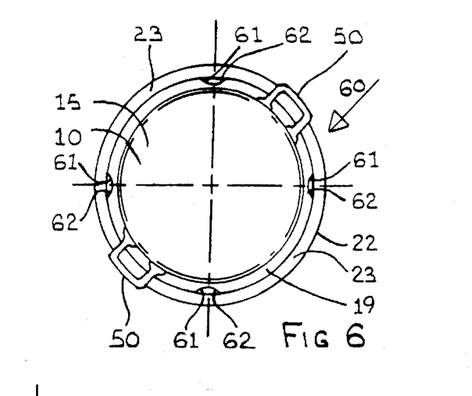
FIG. 6 is an underneath plan view of the freezer box of FIG. 5.
Figure 7:
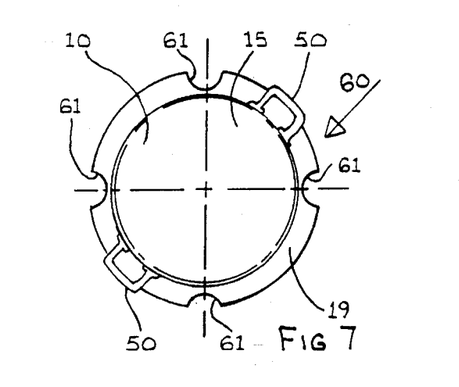
FIG. 7 is an underneath plan view of portion of the freezer box of FIG. 5.
Figure 8:
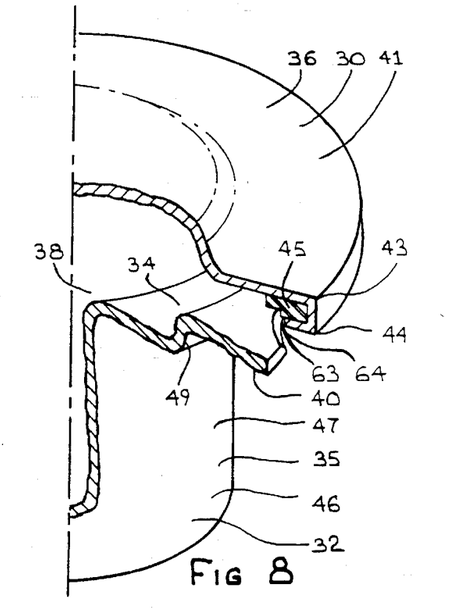
FIG. 8 is a cut-away perspective view of portion of the freezer box of FIG. 5.
Figure 9:
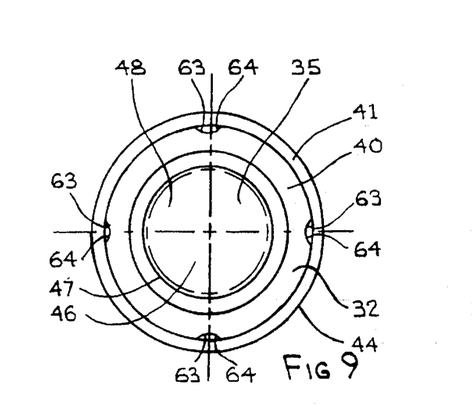
FIG. 9 is an underneath plan view of the portion of FIG. 8.
Figure 10:
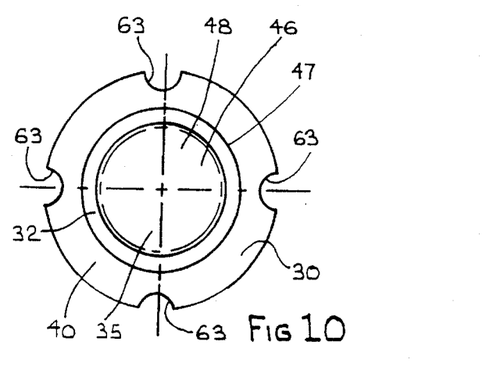
FIG. 10 is an underneath plan view of a detail of the portion of FIG. 9.

A pair of handles 50 of stainless steel material extend outwardly on opposite sides of the first outer side wall 15 to facilitate lifting of the freezer box 1. A handle 51 also of stainless steel material extends upwardly from the second outer wall 36 to facilitate lifting the lid 30.

In this embodiment of the invention the freezer box 1 is dimensioned so that when the lid 30 is in place closing the open mouth 28, and the second heat exchange wall 32 forms with the first heat exchange wall 2, the main hollow interior region 7, the maximum distance between any location in the main hollow interior region 7 and its nearest heat exchange surface 4 or 35 does not exceed 13 mm approximately. This is achieved by virtue of the fact that the first and second heat exchange surfaces 4 and 35 are spaced apart so that the maximum perpendicular distance a between the two surfaces 4 and 35 does not exceed 40 mm, and in this case, does not exceed 26 mm approximately. The maximum value of a in this case is the distance between a portion 54 of the first heat exchange surface 4 intermediate the first inner base 8 and the first inner side wall 9 and a portion 55 of the second heat exchange surface 35 intermediate the second cylindrical side wall 47 and the second base 48. The perpendicular distance between the portions 54 and 55 of the respective surfaces 4 and 35 in this embodiment of the invention is 26 mm approximately. These dimensions are achieved by virtue of the fact the diameter b of the first heat exchange surface 4 is 160 mm. The height c of the main hollow interior region 7 namely, the distance from the first heat exchange surface 4 of the first inner base 8 to the open mouth 28 is 105 mm. The diameter d of the second heat exchange surface at the second cylindrical side wall 47 is 110 mm and the depth e of the cylindrical portion 46, namely, from the second heat exchange surface 35 of the second base 48 to the open mouth 28 when the lid 38 is engaged in the open mouth 28 is 85 mm. Accordingly, the capacity of the main hollow interior region 7 of the freezer box 1 with the lid 30 in place is 1.1 liters. The spacing between the first inner base 8 and the first outer base 14 is approximately 15 mm, and the spacing between the first inner side wall 9 and the first outer side wall 15 is also approximately 15 mm. The capacity of the first secondary hollow interior region 12 of the freezer box 1 is 0.8 liters. The capacity of the second secondary hollow interior region 38 formed in the lid 30 is 0.7 liters. In practice, 0.7 liters of brine 13 is provided in the first secondary hollow interior region 12 while 0.6 liters of brine 39 is provided in the second secondary hollow interior region 38 formed in the lid 30. The brine is provided in the respective first and second hollow interior regions 12 and 38 during assembly of the freezer box 1 and the lid 30 prior to the joints 20 and 37 being made and sealed.

In use, the freezer box 1 and the lid 30 are placed in a freezer until the brine in the secondary hollow interior region 12 and 38 is frozen solid. Preferably, the brine is frozen to a temperature below the eutectic temperature of −21° C. The freezer box 1 and lid 30 are removed from the freezer, and liquid ice cream at room temperature is poured into the main hollow interior region 7 through the open mouth 28, and the lid 30 is engaged in the freezer box 1 to close the open mouth 28 with the cylindrical portion 46 extending into the main hollow interior region 7. The freezer box 1 is left in the room until the ice cream is frozen to the desired consistency. Freezing of the ice cream in the freezer box 1 should take approximately 15 minutes. The lid 30 is then removed from the freezer box 1 and the freezer box 1 is inverted thus, enabling the frozen ice cream to slide through the open mouth 28. Alternatively, the frozen ice cream is scooped out from the main hollow interior region 7 through the open mouth 28. Prior to removing the ice cream from the main hollow interior region 7, the ice cream may be blended with a fork for one or two minutes to further improve the consistency of the ice cream.

Referring now to FIGS. 5 to 10 there is illustrated a freezer box according to another embodiment of the invention indicated generally by the reference numeral 60. The freezer box 60 is substantially similar to the freezer box 1 and similar components are identified by the same reference numerals. The main difference between the freezer box 60 and the freezer box 1 is in the area where the flanges 18 and 19 of the first inner side wall 9 and the first outer side wall 15 of the freezer box 1 are joined, and also in the area where the flanges 40 and 41 of the lid 30 are joined. The flange 19 extending from the outer side wall 15 of the freezer box 60 is provided with four recesses 61 which extend inwardly into the flange 19 from the periphery thereof. When the flanges 18 and 19 are secured together with the first sealing gasket 25, the recesses 61 in the flange 19 form with the inwardly extending return 23 of the flange 18 openings 62 for releasing pressure build-up in the first secondary hollow interior region 12 of the freezer box 1 on the first sealing gasket 25 melting. Indeed, it will be appreciated that the first sealing gasket 25 on melting can flow through the openings 62 formed by the recesses 61. Recesses 63 substantially similar to the recesses 61 are formed in the flange 40 of the lid 30, and form with the flange 41 openings 64 for relieving pressure build-up in the second secondary hollow interior region 38 on the second sealing gasket 45 melting. The function of the recesses 62 is similar to the function of the recesses 61.

Figure 11:
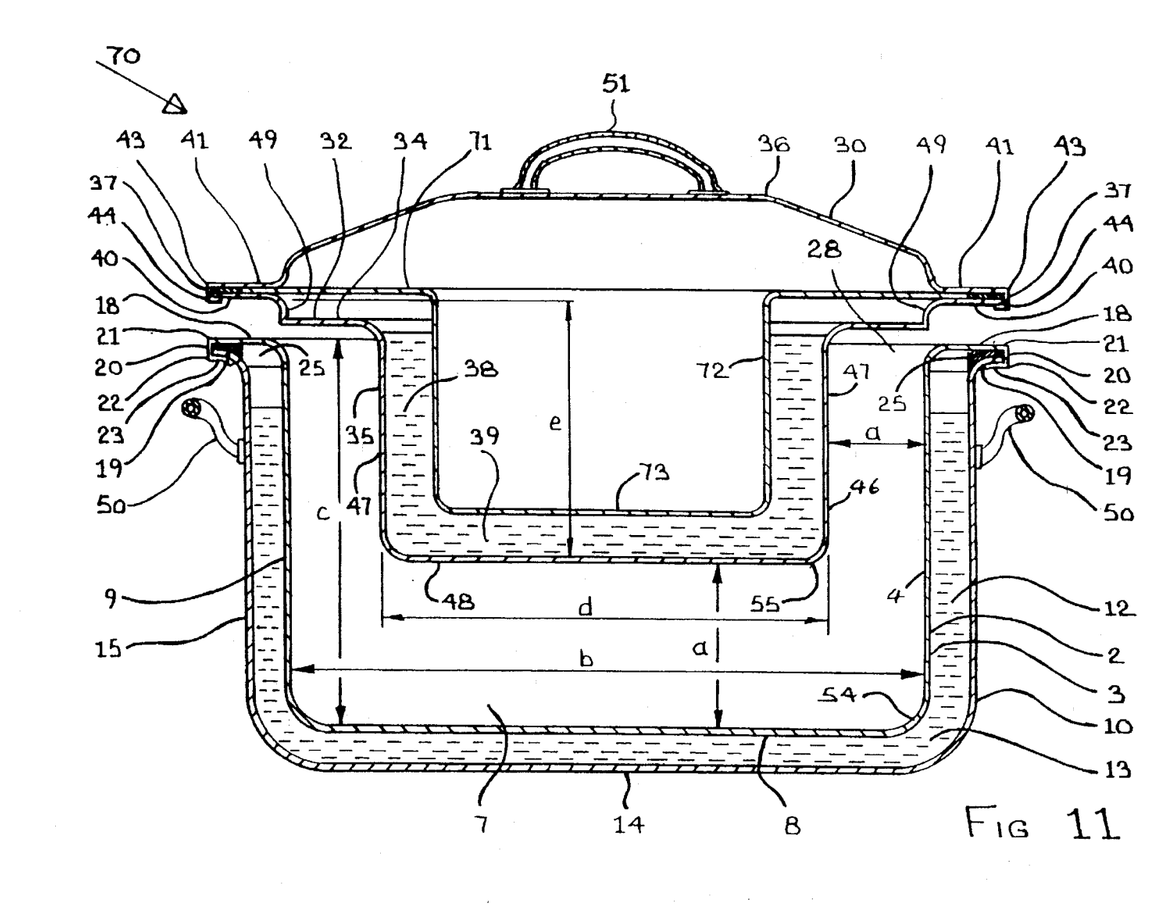
FIG. 11 is a cross-sectional elevational view similar to FIG. 3 of a freezer box according to a further embodiment of the invention.

Referring now to FIG. 11 there is illustrated a freezer box according to a still further embodiment of the invention indicated generally by the reference numeral 70. The freezer box 70 is substantially similar to the freezer box 1, and similar components are identified by the same reference numerals. The main difference between the freezer box 70 and the freezer box 1 is that the volume of the second secondary hollow interior region 38 is reduced by the introduction of an intermediate wall 71. The intermediate wall may be of any suitable material, but typically may be of polyethylene material. The intermediate wall 71 is located between the flanges 40 and 41 in similar fashion as the annular gasket 45 which it replaces. The intermediate wall 71 is shaped to form a cylindrical inner side wall 72 which terminates in an inner base 73. The inner cylindrical side wall 72 is spaced apart from the cylindrical side wall 47, and the base 73 is spaced apart from the base 74, thereby forming the second secondary hollow interior region 38 between the respective side walls 72 and 47 and bases 73 and 48. Typically, the side walls 72 and 47 are spaced apart a distance in the range of 10 mm to 20 mm, and the bases 73 and 48 are spaced apart a distance in the range of 10 mm to 20 mm.

The advantage of the freezer box 70 over the freezer box 1 is that by virtue of the fact that the volume of the second secondary hollow interior region 38 is reduced, less heat sink material is required. This, thus, reduces the weight of the freezer box. It is envisaged that a freezer box according to this embodiment of the invention would be ideally suited to freezer boxes of larger volume than the freezer box 1. For example, it is envisaged that the freezer box according to the freezer box of FIG. 11 would be suitable for freezer boxes, the capacity of the main hollow interior region with the lid in place, of which, would be in the order of 2.5 liters or greater.

It is envisaged that instead of providing the heat sink material in the form of frozen brine, the heat sink material may be brine at a temperature above but close to freezing point, for example, brine at −15° C. in liquid form. In such cases, it is envisaged that the brine could be continuously circulated through the secondary hollow interior regions in series or in parallel. Suitable inlet and outlet connection means would be provided to the respective first and second secondary hollow interior regions. The brine could be maintained at a temperature of −15° C., for example, by any suitable heat exchanger, and could be circulated by a suitable circulating pump.

While the freezer boxes have been described as being of a particular shape, construction and size, freezer boxes of other desirable shapes, construction and sizes may be provided. For example, in certain cases, it is envisaged that the first heat exchange wall defining the main hollow interior region, may define a main hollow interior region of cubic shape, which would be of square cross-section when viewed in plan. Alternatively, the plan cross-sectional area of the main hollow interior region may be rectangular, or indeed of any other suitable or desired shape. Needless to say, the lid would, in general, be correspondingly shaped.

Needless to say, instead of brine, other suitable heat sink materials whether in liquid, solid or gas form may be used, and where the heat sink material is a liquid, in general, it will have a relatively low freezing point. For example, non-toxic anti-freeze, propylene glycol, or the like may be used. Indeed, in certain cases, it is envisaged that the heat sink materials may not in all cases be non-toxic. It is envisaged that a mixture of brine and anti-freeze may be used.

While it is preferable, it is not essential that the entire freezer box should be jacketed.

It will also be appreciated that while it is preferable it is not essential that the open mouth of the freezer box should be closed, and furthermore, it will be appreciated that it is not essential that the lid closing the open mouth should form the second heat exchange wall, and while the second heat exchange wall has been described as being of a particular shape, size and construction, the second heat exchange wall may be of any other suitable or desired shape, construction and size.

Needless to say, the freezer box and lid may be of any other suitable material besides stainless steel, and it is also envisaged that the sealing means may be of any other suitable material. It is also envisaged that the sealing means may be dispensed with. Indeed, in certain cases, it is envisaged that the lid may be made as a one piece component and the freezer box may likewise be made as a one piece component. It is also envisaged that other suitable pressure release means may, if desired be provided for releasing pressure in the respective secondary hollow interior regions, such as, for example, a valve means or the like. Needless to say, the pressure release means may be dispensed with. It is also envisaged that openings adjacent the joints or in any other convenient location which are closed by a material which is responsive to a build up of pressure in the respective hollow interior regions may be provided. In which case, the material responsive to the pressure build up would melt, disintegrate or the like to open the openings.

It is also envisaged that in certain cases the heat exchange surfaces may be coated with a PTFE material or other low friction material to facilitate easy separation of the ice cream from the heat exchange surfaces.

It is also envisaged that the outer wall of the lid and the jacket around the freezer box may be of a heat insulating material.

While the freezer box has been described for freezing an ice cream mix, the freezer box may be used for freezing a sorbet mix, or for freezing, chilling or cooling any other liquid or semi liquid material.

Indeed, the freezer box according to the invention may also be used as a portable freezer, for example, for medical, chemical, biological, or other such uses. The freezer box may also be used for the freezing of soft fruit, such as, for example, raspberries, strawberries, loganberries and the like.

What is claimed is:

1. A freezer box for freezing, chilling or cooling a liquid or solid, the freezer box comprising:

a first heat exchange wall having a first heat exchange surface, the first heat exchange wall defining a main hollow interior region for said liquid or solid, said region having an open mouth;

a jacket extending at least partly around and spaced from the first heat exchange wall to form therebetween a first secondary hollow interior region for a heat sink material;

a second heat exchange wall releasably engageable with the freezer box and having a second heat exchange surface, the second heat exchange wall defining a second secondary hollow interior region for holding a heat sink material, wherein the second heat exchange surface extends into the main hollow interior region such that the maximum distance between any location in the main hollow interior region and its nearest heat exchange surface does not exceed 26 mm.

2. A freezer box as claimed in claim 1, wherein, the maximum distance between any location in the main hollow interior region and its nearest heat exchange surface does not exceed 20 mm.

3. A freezer box as claimed in claim 2, wherein the maximum distance between any location in the main hollow interior region and its nearest heat exchange surface does not exceed 13 mm.

4. A freezer box as claimed in claim 1, wherein the first and second heat exchange surfaces are located relative to each other so that the maximum distance between the first and second heat exchange surfaces measured perpendicularly to the respective surfaces does not exceed 40 mm.

5. A freezer box as claimed in claim 4, wherein the maximum distance between the first and second heat exchange surfaces measured perpendicularly to the respective surfaces does not exceed 30 mm.

6. A freezer box as claimed in claim 5, wherein the maximum distance between the first and second heat exchange surfaces measured perpendicularly to the respective surfaces does not exceed 26 mm.

7. A freezer box as claimed in claim 1, wherein the jacket extends completely around the first heat exchange wall.

8. A freezer box as claimed in claim 1, wherein the first heat exchange wall comprises a first inner base and a first upstanding inner side all extending around and upwardly from the first inner base.

9. A freezer box as claimed in claim 8, wherein the first inner side wall is of cylindrical shape.

10. A freezer box as claimed in claim 8, wherein the open mouth is defined by the first inner side wall.

11. A freezer box as claimed in claim 1, wherein the area of the open mouth is substantially similar to the transverse cross-sectional area of the main hollow interior region formed by the first inner side wall.

12. A freezer box as claimed in claim 1, wherein the area of the open mouth is similar to or greater than the maximum transverse cross-sectional area of the main hollow interior region looking through the open mouth.

13. A freezer box as claimed in claim 8, wherein the jacket comprises a first outer base spaced apart from the first inner base, and a first upstanding outer side wall extending around and upwardly from the first outer base, the first outer base and the first outer side wall being spaced apart from the first inner base and the first inner side wall, respectively, and forming with first inner base and the first inner side wall the first secondary hollow interior region.

14. A freezer box as claimed in claim 13, wherein the first outer side wall is of cylindrical shape and is co-axial with the first inner side wall.

15. A freezer box as claimed in claim 13, wherein the first inner side wall and the first outer side wall are joined adjacent the open mouth.

16. A freezer box as claimed in claim 1, wherein the second heat exchange wall forms a lid for closing the open mouth, the second heat exchange surface co-operating with the first heat exchange surface for forming the main hollow interior region.

17. A freezer box as claimed in claim 16, wherein a portion of the second heat exchange wall extends into the main hollow interior region.

18. A freezer box as claimed in claim 17, wherein the portion of the second heat exchange wall extending into the main hollow interior region is formed by a second side wall which terminates in a second base.

19. A freezer box as claimed in claim 18, wherein the second side wall is of cylindrical shape.

20. A freezer box as claimed in claim 1, wherein a second outer wall spaced apart from the second heat exchange wall forms with the outer surface of the second heat exchange wall the second secondary hollow interior region.

21. A freezer box as claimed in claim 20, wherein the second outer wall and the second heat exchange wall are joined around respective peripheral edges thereof.

22. A freezer box as claimed in claim 1, wherein the first and second heat exchange walls are of heat conductive material.

23. A freezer box as claimed in claim 22, wherein the heat conductive material is stainless steel.

24. A freezer box as claimed in claim 23, wherein the stainless steel is stainless steel type 18–10.

25. A freezer box as claimed in claim 1, wherein a first pressure release means is provided communicating with the first secondary hollow interior region for releasing a build up of pressure in the first secondary hollow interior region.

26. A freezer box as claimed in claim 25, wherein the first pressure release means is provided at a location adjacent the position where the first inner side wall and the first outer side wall are joined.

27. A freezer box as claimed in claim 25, wherein the first pressure release means is provided intermediate the first inner side wall and the first outer side wall adjacent the joint between the said side walls.

28. A freezer box as claimed in claim 27, wherein the first pressure release means comprises a first sealing means located between and sealing the joint between the first inner and outer side walls, the first sealing means being responsive to a build up of pressure in the first secondary hollow interior region for releasing the pressure therein.

29. A freezer box as claimed in claim 28, wherein the first sealing means is of a material which melts on being subjected to heat for breaking the seal in the joint between the first inner and outer side walls.

30. A freezer box as claimed in claim 28, wherein the first sealing means is of a material which melts on being subjected to the boiling point at a relatively safe pressure of the heat sink material.

31. A freezer box as claimed in claim 28, wherein the first sealing means is of plastics material.

32. A freezer box as claimed in claim 28, wherein the first sealing means is of polyethylene material.

33. A freezer box as claimed in claim 1, wherein a second pressure release means is provided communicating with the second secondary hollow interior region for releasing a build up of pressure in the second secondary hollow interior region.

34. A freezer box as claimed in claim 33, wherein the second pressure release means is provided at a location adjacent the position where the second heat exchange wall and the second outer wall are joined.

35. A freezer box as claimed in claim 33, wherein the second pressure release means is provided intermediate the second heat exchange wall and the second outer wall adjacent the joint between the said walls.

36. A freezer box as claimed in claim 35, wherein the second pressure release means comprises a second sealing means located between and sealing the joint between the second heat exchange wall and the second outer wall, the second sealing means being responsive to a build up of pressure in the second secondary hollow interior region for releasing the pressure therein.

37. A freezer box as claimed in claim 36, wherein the second sealing means is of a material which melts on being subjected to heat for breaking the seal in the joint between the said walls.

38. A freezer box as claimed in claim 36, wherein the second sealing means is of a material which melts on being subjected to the boiling point at a relatively safe pressure of the heat sink material.

39. A freezer box as claimed in claim 36, wherein the second sealing means is of plastics material.

40. A freezer box as claimed in claim 36, wherein the second sealing means is of polyethylene material.

41. A freezer box as claimed in claim 1, wherein the heat sink material is provided in the first and second secondary hollow interior regions.

42. A freezer box as claimed in claim 41, wherein the heat sink material is brine.

43. A freezer box as claimed in claim 41, wherein the heat sink material has a freezing point not higher than 0° C.

44. A freezer box as claimed in claim 41, wherein the heat sink material has a freezing point not higher than −10° C.

45. A freezer box as claimed in claim 41, wherein the heat sink material has a freezing point not higher than −15° C.

46. A freezer box as claimed in claim 1, wherein first and second connecting means are provided for respectively connecting the first and second secondary hollow interior regions to the heat sink material for circulation of the heat sink material through the respective first and second secondary hollow interior regions.

47. A freezer box as claimed in claim 1, wherein the capacity of the main hollow interior region with the second heat exchange wall engaged with the freezer box is in the range of 0.5 liters to 2.5 liters.

48. A freezer box as claimed in claim 1, wherein the capacity of the main hollow interior region with the second heat exchange wall engaged with the freezer box is at least 1 liter.

49. A freezer box as claimed in claim 1, Wherein the capacity of the main hollow interior region with the second heat exchange wall engaged with the freezer box does not exceed 1.5 liters.

50. A freezer box as claimed in claim 1, wherein the capacity of the main hollow interior region with the second heat exchange wall engaged with the freezer box is approximately 1.1 liters.

* * * * *

UNITED STATES PATENT AND TRADEMARK OFFICE
CERTIFICATE OF CORRECTION

PATENT NO. : 5,520,014
DATED : May 28, 1996
INVENTOR(S) : MICHAEL T. LAUGIER

It is certified that error appears in the above-indentified patent and that said Letters Patent is hereby corrected as shown below:

Item [57], in the Abstract, line 7, delete "secon", insert --second--

Col. 6, line 12, after the first occurrence of "wall", delete "g", insert --9--

Col. 7, line 63, after "box", delete "i", insert --1--

Col. 14, line 1, delete "Wherein", insert --wherein--

Signed and Sealed this

Twenty-seventh Day of August, 1996

Attest:

BRUCE LEHMAN

*Attesting Officer*     *Commissioner of Patents and Trademarks*